(«12») United States Patent
Kim et al.

(10) Patent No.: US 10,589,737 B2
(45) Date of Patent: Mar. 17, 2020

(54) METHOD AND DEVICE FOR CONTROLLING MILD HYBRID VEHICLE

(71) Applicants: HYUNDAI MOTOR COMPANY, Seoul (KR); KIA MOTORS CORPORATION, Seoul (KR)

(72) Inventors: YoungMin Kim, Yongin-si (KR); Hyun Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 146 days.

(21) Appl. No.: 15/829,342

(22) Filed: Dec. 1, 2017

(65) Prior Publication Data

US 2019/0118799 A1  Apr. 25, 2019

(30) Foreign Application Priority Data

Oct. 23, 2017 (KR) .................. 10-2017-0137059

(51) Int. Cl.
*B60W 20/50* (2016.01)
*F02D 41/22* (2006.01)
(Continued)

(52) U.S. Cl.
CPC ............ *B60W 20/50* (2013.01); *B60K 6/485* (2013.01); *B60W 10/08* (2013.01); *B60W 10/30* (2013.01); *B60W 50/14* (2013.01); *F02D 41/22* (2013.01); *F02D 41/221* (2013.01); *F02D 41/3094* (2013.01); *G07C 5/0825* (2013.01); *B60W 2050/143* (2013.01); *B60W 2510/0614* (2013.01); *B60W 2710/0616* (2013.01);
(Continued)

(58) Field of Classification Search
CPC ...... B60W 20/50; B60W 10/08; B60W 10/06; B60K 6/485; B60K 2006/4825; B60K 6/48
See application file for complete search history.

(56) References Cited

U.S. PATENT DOCUMENTS 4,499,885 A * 2/1985 Weissenbach ...... F02D 19/0647
123/27 GE
6,003,478 A * 12/1999 Huber ...................... F02B 7/06
123/27 GE
(Continued)

FOREIGN PATENT DOCUMENTS

JP  3883840 B2  2/2007
JP  2015-214194 A  12/2015
KR  10-0992817 B1  11/2010

*Primary Examiner* — Hunter B Lonsberry
*Assistant Examiner* — Luis A Martinez Borrero
(74) *Attorney, Agent, or Firm* — Morgan, Lewis & Bockius LLP

(57) ABSTRACT

A method for controlling a mild hybrid vehicle is disclosed. The method includes: controlling a multi-point injection (MPI) fuel system for supplying fuel to an engine for a low revolutions-per-minute (RPM) operation; subsequently, causing a gasoline direct injection (GDI) fuel system for a high RPM operation; switching to the multi-point injection fuel system when it is determined that the gasoline direct injection fuel system fails. The method further comprises calculating a torque deficiency due to the switching from the GDI fuel system to the MPI fuel system and controlling a starter-generator to generate an assist torque to compensate the torque deficiency.

5 Claims, 5 Drawing Sheets

(51) Int. Cl.
  *B60K 6/485*   (2007.10)
  *B60W 10/08*   (2006.01)
  *B60W 10/30*   (2006.01)
  *B60W 50/14*   (2020.01)
  *F02D 41/30*   (2006.01)
  *G07C 5/08*    (2006.01)
  *F02D 41/38*   (2006.01)

(52) U.S. Cl.
  CPC ........ *F02D 41/38* (2013.01); *F02D 2041/224* (2013.01); *F02D 2041/389* (2013.01); *F02D 2200/101* (2013.01); *F02D 2200/1004* (2013.01); *Y10S 903/904* (2013.01)

(56) References Cited

U.S. PATENT DOCUMENTS

| | | | | |
|---|---|---|---|---|
| 7,263,973 | B2* | 9/2007 | Akita | F02D 41/3094 |
| | | | | 123/299 |
| 8,002,058 | B2* | 8/2011 | Ishikawa | B60W 30/02 |
| | | | | 180/65.265 |
| 8,794,936 | B2* | 8/2014 | Tokuo | F02M 37/0047 |
| | | | | 417/442 |
| 8,880,254 | B2* | 11/2014 | Choi | B60W 30/192 |
| | | | | 701/22 |
| 9,216,639 | B2* | 12/2015 | Yamamoto | F02D 41/065 |
| 9,291,117 | B2* | 3/2016 | Lee | F02D 41/221 |
| 9,481,363 | B2* | 11/2016 | Poertner | B60L 50/16 |
| 9,488,136 | B2* | 11/2016 | Pearce | F02M 25/0809 |
| 9,523,325 | B2* | 12/2016 | Koo | F02D 41/221 |
| 9,938,922 | B2* | 4/2018 | Whitaker | F02D 41/3094 |
| 9,938,949 | B2* | 4/2018 | Kim | F02M 69/54 |
| 10,077,043 | B2* | 9/2018 | Kim | B60W 20/15 |
| 10,184,860 | B2* | 1/2019 | Schweikert | F02D 41/009 |
| 10,260,440 | B2* | 4/2019 | Mano | F02D 41/3094 |
| 10,351,126 | B2* | 7/2019 | Kim | F02D 41/0025 |
| 2002/0129795 | A1* | 9/2002 | Wheeler | F02B 61/02 |
| | | | | 123/479 |
| 2003/0121492 | A1* | 7/2003 | Wheeler | F02B 61/02 |
| | | | | 123/198 D |
| 2007/0199542 | A1* | 8/2007 | Tokuda | F02D 33/006 |
| | | | | 123/431 |
| 2009/0320796 | A1* | 12/2009 | Kojima | F02M 55/04 |
| | | | | 123/447 |
| 2011/0097228 | A1* | 4/2011 | Tokuo | F02M 37/0047 |
| | | | | 417/505 |
| 2014/0316622 | A1* | 10/2014 | Martin | B60W 10/06 |
| | | | | 701/22 |
| 2015/0047590 | A1* | 2/2015 | Kim | F02D 19/025 |
| | | | | 123/1 A |
| 2015/0083089 | A1* | 3/2015 | Pearce | F02M 25/0809 |
| | | | | 123/520 |
| 2015/0159579 | A1* | 6/2015 | Whitaker | F02D 41/3094 |
| | | | | 123/478 |
| 2016/0281624 | A1* | 9/2016 | Dames | F02D 41/40 |
| 2017/0151941 | A1* | 6/2017 | Kim | F02M 26/15 |
| 2017/0158185 | A1* | 6/2017 | Kim | B60W 30/18054 |
| 2017/0166198 | A1* | 6/2017 | Jin | B60K 6/24 |
| 2017/0260925 | A1* | 9/2017 | Ikeuchi | F02D 41/3094 |
| 2017/0291594 | A1* | 10/2017 | Kim | F02D 41/1401 |
| 2017/0292467 | A1* | 10/2017 | Schweikert | F02D 41/26 |
| 2017/0292898 | A1* | 10/2017 | Schweikert | F02D 41/009 |
| 2017/0305409 | A1* | 10/2017 | Kim | B60W 20/15 |
| 2018/0174374 | A1* | 6/2018 | Choi | B60W 20/50 |
| 2018/0195449 | A1* | 7/2018 | Mano | F02D 41/3094 |
| 2018/0339696 | A1* | 11/2018 | Kim | B60K 6/48 |
| 2019/0126909 | A1* | 5/2019 | Kim | B60K 6/24 |

* cited by examiner

METHOD AND DEVICE FOR CONTROLLING MILD HYBRID VEHICLE

CROSS-REFERENCE TO RELATED APPLICATION

This application claims priority to and the benefit of Korean Patent Application No. 10-2017-0137059 filed in the Korean Intellectual Property Office on Oct. 23, 2017, the entire contents of which are incorporated herein by reference.

BACKGROUND

(a) Field

The present disclosure relates to a mild hybrid vehicle (or a mild hybrid electric vehicle), and more particularly, to a method and a device for controlling a mild hybrid vehicle.

(b) Description of the Related Art

A hybrid electric vehicle uses both an internal combustion engine and a battery power source. The hybrid electric vehicle efficiently combines the torque of the internal combustion engine and the torque of a motor.

Hybrid electric vehicles may be categorized as either a hard type or a mild type according to a power sharing ratio between the engine and the motor. In the case of the mild type of hybrid electric vehicle (or a mild hybrid electric vehicle), a mild hybrid starter & generator (MHSG) configured to start the engine or generate electricity according to an output of the engine is used instead of an alternator. In the case of the hard type of hybrid electric vehicle, a driving motor for generating driving torque is used in addition to an integrated starter & generator (ISG) configured to start the engine or generate electricity.

The above information disclosed in this Background section is only for enhancement of understanding of background of the invention. Applicant notes that this section may contain information available before this application. However, by providing this section, Applicant does not admit that any information contained in this section constitutes prior art.

SUMMARY

A mild hybrid electric vehicle does not provide a driving mode in which torque of the MHSG is used for the main driving torque, but the MHSG may assist the torque of the engine according to the running state of the vehicle and may charge a battery (e.g., a 48 V battery) through regenerative braking. Accordingly, the fuel efficiency of the mild hybrid electric vehicle may be improved.

A hybrid vehicle may include a gasoline direct injection (GDI) engine for providing a high output and fuel economy in comparison with a comparable engine and/or a multi-point injection (MPI) engine with low vibration and noise and high durability.

The present disclosure has been made in an effort to a method for controlling a method and a device for controlling a hybrid vehicle having a multi-point injection (MPI) fuel system and a gasoline direct injection (GDI) fuel system. The hybrid vehicle can use the multi-point injection (MPI) fuel system and a starter-generator simultaneously when the gasoline direct injection (GDI) fuel system of the hybrid vehicle fails.

An embodiment of the present invention may provide the method for controlling the mild hybrid vehicle, including: controlling, by a controller, a multi-point injection fuel system supplying fuel to an engine to be operated; controlling, by the controller, a fuel system that supplies fuel to the engine to be changed to a gasoline direct injection fuel system when a number of rotation of the engine is greater than or equal to a reference speed after the multi-point injection fuel system is operated; determining, by the controller, whether a failure of the gasoline direct injection fuel system occurs; changing, by the controller, the fuel system supplying fuel to the engine to the multi-point injection fuel system when it is determined that the gasoline direct injection fuel system fails; calculating, the controller, a difference value between torque of the engine operated by the multi-point injection fuel system and torque of the engine operated by the gasoline direct injection fuel system; and controlling, by the controller, a starter-generator to assist torque of the engine by the difference value.

The method for controlling the mild hybrid vehicle may further include: determining, by the controller, whether failure maintenance time of the gasoline direct injection fuel system is greater than a reference time when it is determined that the gasoline direct injection fuel system fails before the fuel system supplying fuel to the engine is changed to the multi-point injection fuel system.

The method for controlling the mild hybrid vehicle may further include controlling, by the controller, a warning light installed in the engine to be turned on when the failure maintenance time is greater than the reference time.

The failure of the gasoline direct injection fuel system may include a failure of a gasoline direct injection injector included in the gasoline direct injection fuel system.

An embodiment of the present invention may provide the device for controlling the mild hybrid vehicle, including: a multi-point injection fuel system configured to supply fuel to an engine; a gasoline direct injection fuel system configured to supply fuel to the engine when a number of rotation of the engine is greater than or equal to a reference speed after the multi-point injection fuel system is operated; and a controller configured to determine whether a failure of the gasoline direct injection fuel system occurs. The controller may change the fuel system supplying fuel to the engine to the multi-point injection fuel system when it is determined that the gasoline direct injection fuel system fails, may calculate a difference value between torque of the engine operated by the multi-point injection fuel system and torque of the engine operated by the gasoline direct injection fuel system, and may control a starter-generator to assist torque of the engine by the difference value.

When parts of the gasoline direct injection (GDI) fuel system currently used fail, the method and the device for controlling the mild hybrid vehicle according to the embodiment of the present invention may control the vehicle so that the driver drives the vehicle without any restriction by changing the fuel system to the multi-point injection (MPI) fuel system and compensating the torque of the engine not provided by the MPI system using the starter-generator.

Further, embodiments of the present invention may normally control revolutions per minute (RPM) of the engine, and thus may prevent increase of RPM of the engine in an idle state of the vehicle (or the engine) that is generated when the fuel system fails. Thus, embodiments of the present invention may improve fuel efficiency of the vehicle.

DETAILED DESCRIPTION

Figure 1:
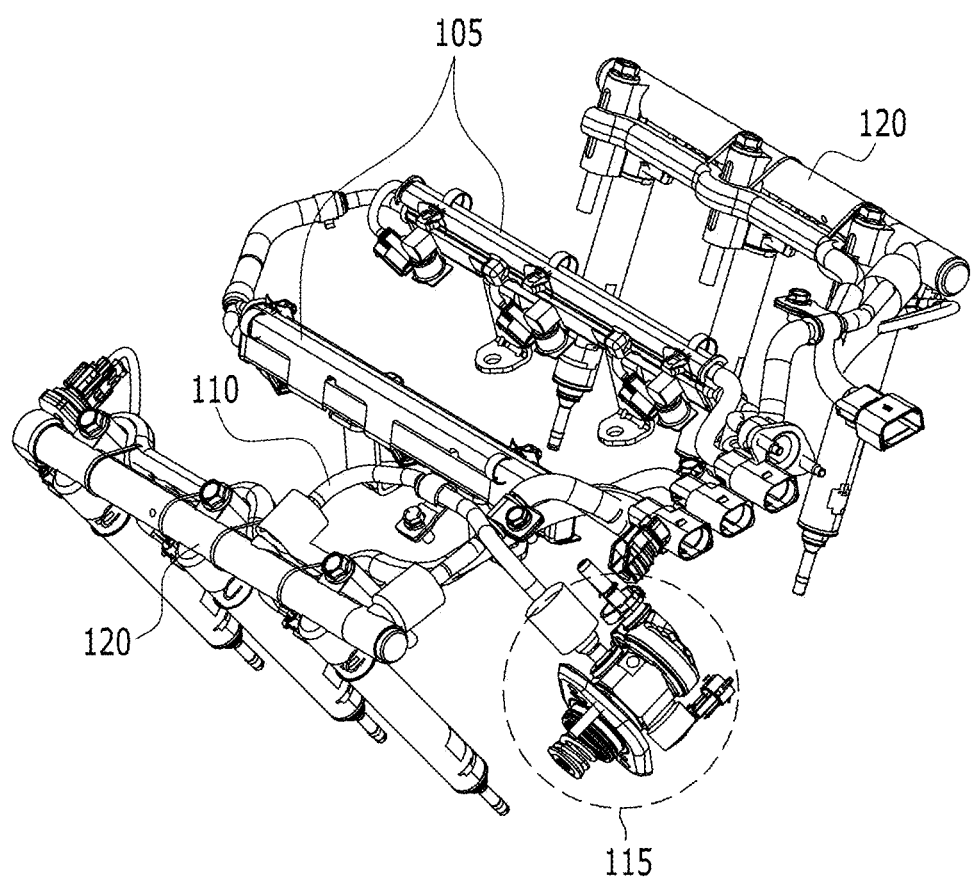
FIG. 1 is a perspective view illustrating a multi-point injection (MPI) fuel system and a gasoline direct injection (GDI) fuel system to which a method for controlling a mild hybrid vehicle according to embodiments of the present invention is applied.

In order to sufficiently understand features the present invention and the object achieved by embodying the present invention, the accompanying drawings illustrating embodiments of the present invention and contents described in the accompanying drawings are to be referenced.

Hereinafter, embodiments of the present invention will be described in detail by describing embodiments of the present invention with reference to the accompanying drawings. In describing embodiments of the present invention, well-known configurations or functions will not be described in detail since they may unnecessarily obscure the gist of the present invention. Throughout the accompanying drawings, the same reference numerals will be used to denote the same components.

Terms used in the present specification are only used in order to describe embodiments rather than limiting the present invention. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it s described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

An aspect of the invention provides a method for controlling a hybrid vehicle having two separate fuel supply systems for its combustion engine. For starting of the engine and a low RPM (lower than 1500) operation of the engine, a multi-point injection (MPI) system supplies fuel to the engine. When starting the vehicle, a motor/generator (MHSG) of the hybrid vehicle also operates in combination with the MPI system.

Subsequently, for a high RPM (higher than 1500) operation of the engine, instead of the MPI system, the vehicle uses a gasoline direct injection (GDI) system to supply fuel to the engine. While the vehicle is using the GDI system, a computing device (controller, 200) of the hybrid vehicle monitors signals from at least one sensor connected to the GDI system. In embodiments, the controller 200 determines whether the GDI system is not working properly using signals from a fuel quantity sensor and/or a fuel pressure sensor.

Subsequently, when it is determined that the GDI system is not working properly (a failure of the GDI system), the controller 200 stops the GDI system and activates MPI system to supply fuel to the combustion engine even for a high RPM (>1500) operation. Running on MPI system may close a drop in the engine's output torque when compared to running on GDI system. In embodiments, for a first RPM higher than 1500, it is expected for the engine to generate a first torque when running on the GDI system and to generate a second torque less than the first torque when running on the MPI system.

Subsequent to the switching to MPI system, the controller 200 estimates a torque drop for a current RPM of the engine, and cause the motor/generator to generate additional torque to compensate the estimated torque drop.

Recently, a mild hybrid vehicle including a mild hybrid starter & generator (MHSG) that simultaneously uses a multi-point injection (MPI) fuel system (or a port fuel injection (PFI) fuel system) and a gasoline direct injection (GDI) fuel system (or a direct injection (DI) fuel system) has been developed.

According to a related art, when a failure of parts of the GDI fuel system occurs during use of the GDI fuel system in the MPI fuel system and the GDI fuel system connected to a gasoline engine, torque and output (or power) of the engine may be limited so that a limp home control (or emergency operation control) is performed in a vehicle. Thus, a driver of the vehicle may have driving restriction such as the vehicle speed limitation.

Specifically, the MPI fuel system may be used to start the engine (or a mild hybrid vehicle). A fuel system of the vehicle may be changed to the GDI fuel system when the engine speed is increased to 1500 revolutions per minute (RPM) after start of the engine. Limp-home control for the vehicle is performed due to torque and output limitations of the engine in an event of a failure of a part (e.g., a high pressure pump or a high pressure injector) associated with the GDI fuel system after the change to the GDI fuel system. When limp-home control (or safety driving control in a case of the failure) is performed, the vehicle speed is limited to less than 60 to 80 kilometers per hour (KPH) and RPM of the engine may be limited.

In other words, limp-home control performed due to torque and output limitations may cause a restriction on driving of the vehicle when the part of the GDI fuel system fails during driving of the vehicle. Also, in an idle state of the engine, the engine RPM may be controlled as 1500-2000 RPM.

Figure 2:
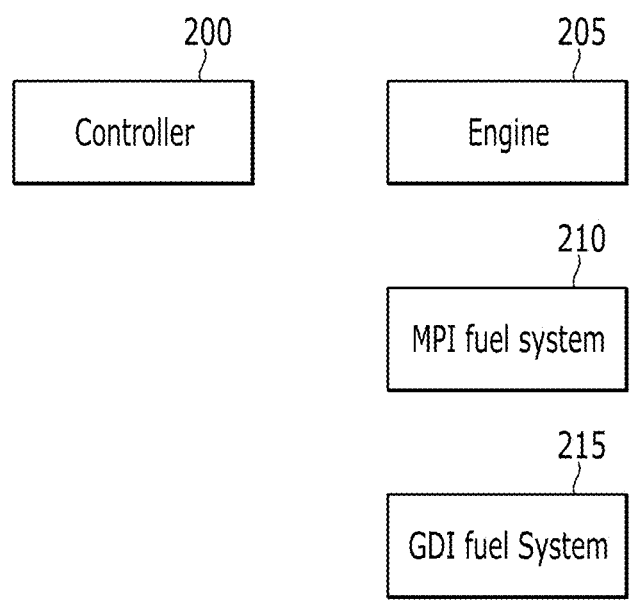
FIG. 2 is a block diagram illustrating a device for controlling a mild hybrid vehicle to which the method for controlling the mild hybrid vehicle according to embodiments of the present invention is applied.

FIG. 1 is a perspective view illustrating a multi-point injection (MPI) fuel system and a gasoline direct injection (GDI) fuel system to which a method for controlling a mild hybrid vehicle according embodiments of the present invention is applied. FIG. 2 is a block diagram illustrating a device for controlling a mild hybrid vehicle to which the method for controlling the mild hybrid vehicle according to embodiments of the present invention is applied.

Referring to FIG. 1 and FIG. 2, the mild hybrid vehicle includes an MPI fuel system 210 including an MPI injector rail assembly 105, and a GDI fuel system 215 including a GDI injector rail assembly 120, a GDI high pressure pump 115, and a high pressure pipe 110 connecting the GDI injector rail assembly and the GDI high pressure pump.

A device for controlling the mild hybrid vehicle included in the mild hybrid vehicle may include a controller 200 including an electronic control unit (ECU) for controlling an engine 205, the MPI fuel system 210 that supplies a fuel (e.g., gasoline) to an intake manifold connected to the engine or an intake port of a cylinder head of the engine, and the GDI fuel system 215 that supplies fuel to a cylinder of the engine (or a combustion chamber of the engine).

The MPI fuel system (or a MPI fuel device) 210 may include an MPI injector that supplies fuel to the intake manifold connected to the engine 205 and is connected to the MPI injector rail assembly 105 (or a lower portion of the MPI injector rail assembly) and a low pressure fuel pump that pumps fuel to the MPI injector.

The GDI fuel system (or a GDI fuel device) 215 may include a GDI injector (or a GDI high-pressure injector) that supplies fuel to the combustion chamber of the engine 205 and is connected to the GDI injector rail assembly 120), the GDI high pressure fuel pump 115 pumping fuel to the GDI injector, a low pressure fuel pump pumping fuel to the GDI high pressure fuel pump 115, and a GDI high pressure fuel sensor detecting whether a pressure of a pipe connecting the GDI high pressure fuel pump and the low pressure fuel pump is high.

The controller 200 may control an operation of the MPI fuel system 210 and an operation of the GDI fuel system 215. For example, the controller 200 may output a control signal for controlling fuel injection timing to the injector included in the fuel system. The controller 200 may control an overall operation of the mild hybrid vehicle. For example, the controller 200 may be one or more microprocessors operated by a program or hardware including the microprocessor. The program may include a series of commands for executing the method for controlling the mild hybrid vehicle according to embodiments of the present invention. The commands may be stored in a memory.

Figure 3:
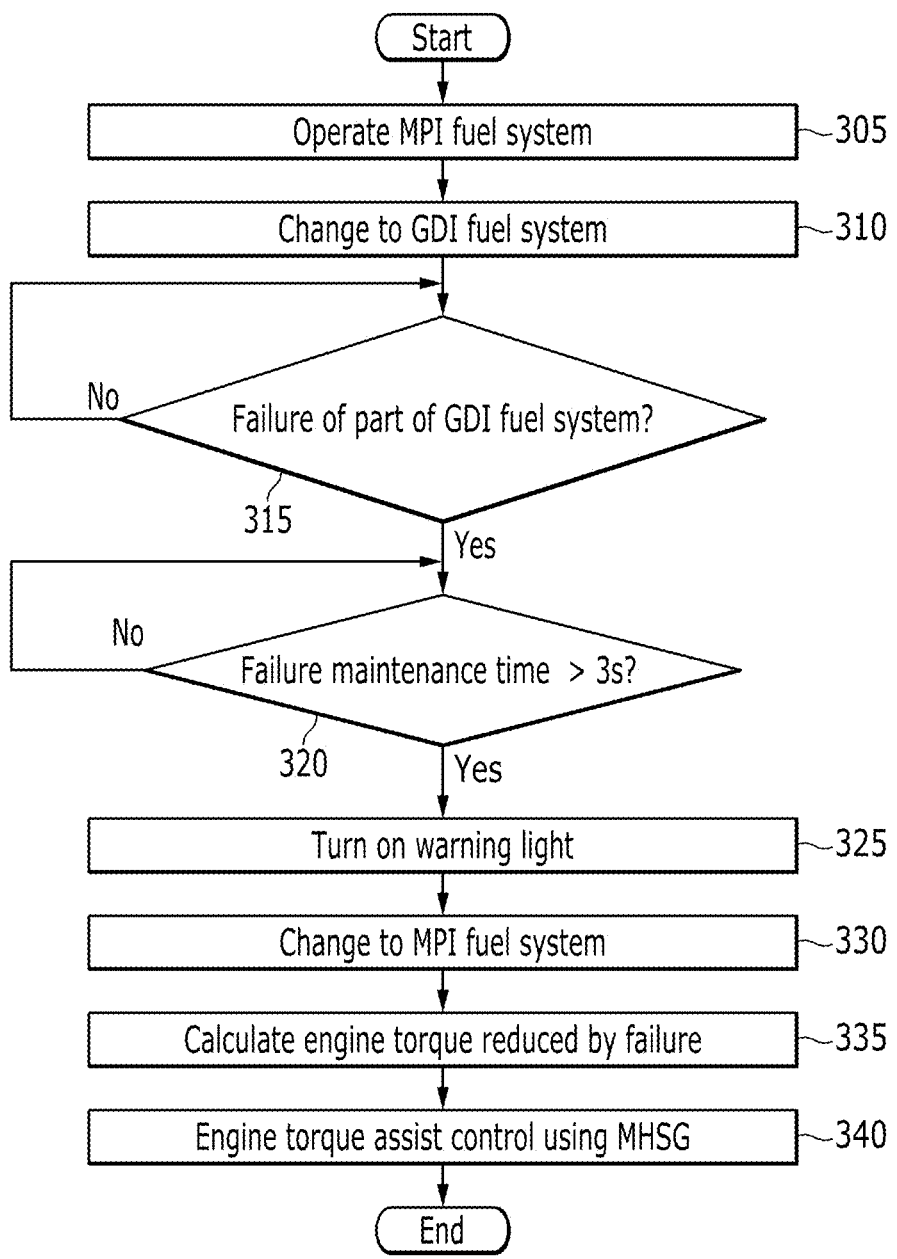
FIG. 3 is a flowchart illustrating the method for controlling the mild hybrid vehicle according to embodiments of the present invention.
Figure 4:
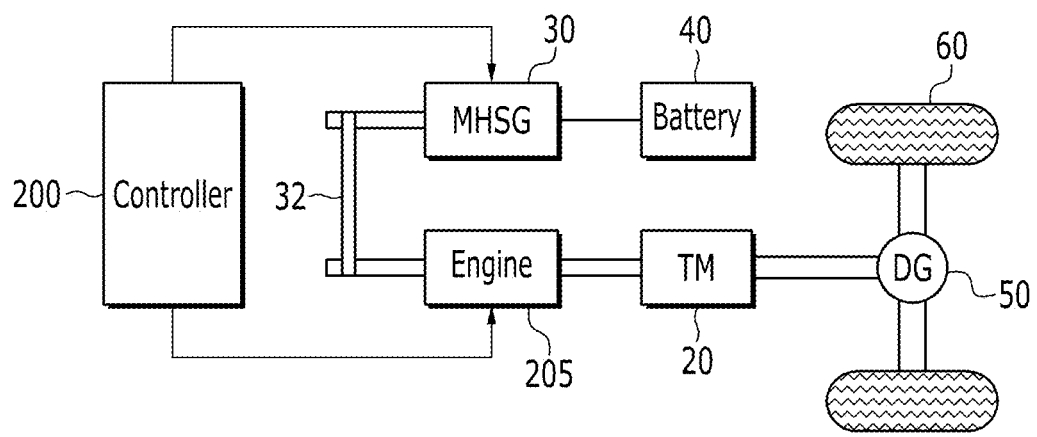
FIG. 4 is a block diagram illustrating a mild hybrid vehicle to which the method for controlling the mild hybrid vehicle shown in FIG. 3 is applied.

FIG. 3 is a flowchart illustrating the method for controlling the mild hybrid vehicle according to embodiments of the present invention. The method for controlling the mild hybrid vehicle may be applied to the device shown in FIG. 2. FIG. 4 is a block diagram illustrating a mild hybrid vehicle to which the method for controlling the mild hybrid vehicle shown in FIG. 3 is applied.

Referring to FIG. 2 to FIG. 4, in a start step 305, the controller 200 may control the MPI fuel system 210 supplying fuel to the engine 205 to be operated (or started) when a start key of the mild hybrid vehicle is turned. Also, the controller 200 may control the engine 205 to start by controlling a mild hybrid starter and generator (MHSG) 30.

The mild hybrid vehicle includes the engine 205, a transmission 20, the starter-generator (or the mild hybrid starter and generator) 30, a battery 40, a differential gear device 50, wheels 60, and the controller 200.

The engine 205 may convert chemical energy to mechanical energy by burning fuel and air. Torque of the engine 205 may be transmitted to an input shaft of the transmission 20, and torque output from an output shaft of the transmission may be transmitted to an axle of the vehicle via the differential gear device 50. The axle may rotate the wheels 60 so that the mild hybrid vehicle may be driven.

The starter-generator 30 may convert electrical energy to mechanical energy or mechanical energy to electrical energy. In other words, the starter-generator 30 may start the engine 205 or generate electricity according to an output of the engine 205. In addition, the starter-generator 30 may assist the torque of the engine 205. The mild hybrid vehicle may use the torque of the starter-generator 30 as an auxiliary power while combustion torque of the engine 205 is a main power. The engine 205 and the starter-generator 30 may be connected via the belt 32 (or a pulley and a belt).

In the mild hybrid vehicle, the starter-generator 30 may be a part performing functions of an alternator, the engine torque assist, or regenerative braking.

The starter-generator 30 may drive the engine 205 of the vehicle in a cranking and torque control mode of the vehicle (or the engine) and may generate electricity according to an output of the engine to charge the 48 V battery 40 in an electricity generation mode of the vehicle. The starter-generator 30 may operate in an operating mode in accordance with a driving state of the vehicle. The operating mode may include an engine starting mode, an engine torque assist mode for assisting torque of the engine by operating as a motor, a mode for charging the 48 V battery charging the 12 V battery that is connected to the 48 V battery via the LDC, a regenerative braking mode for charging the 48 V battery, or an inertial driving mode for extending a mileage of the vehicle. The starter-generator 30 may be optimally controlled according to the driving state of the vehicle to increase fuel efficiency of the vehicle.

The battery 40 may supply electricity to the starter-generator 30 or may be charged by electricity collected through the starter-generator 30 in a regenerative braking mode of the vehicle. The battery 40 may be a 48 V battery. The mild hybrid vehicle may further include a low voltage DC-DC converter (LDC) that converts voltage supplied from the battery 40 to a low voltage and a 12 V battery that supplies the low voltage to an electric load of the vehicle.

According to a change step 310, when a number of rotation (e.g., an RPM) of the engine 205 is greater than or equal to a reference speed (e.g., 1500 RPM) after the MPI fuel system 210 is operated (or activated), the controller 200 may control the fuel system that supplies fuel to the engine 205 to be changed to the GDI fuel system 215. For example, the number of rotation of the engine 205 may be detected by the RPM sensor and may be provided to the controller 200.

According to a determination step 315, the controller 200 may detect a failure (or failure of the GDI fuel system) in a part (e.g., the GDI high pressure fuel pump or the GDI injector) included in the GDI fuel system 215 to determine whether a failure of the GDI fuel system occurs. The controller 200 may detect the failure of the GDI fuel system using a signal output from a sensor that is installed in the GDI fuel system 215 and includes the GDI high pressure fuel sensor. In another embodiment of the present invention, the controller 200 may detect the failure of the GDI fuel system 215 using air-fuel ratio information provided by a fuel quantity detection sensor installed in the GDI fuel system 215 (or the engine 205) or fuel pressure output from a pressure sensor installed in the GDI fuel system 215 (or the engine 205).

According to a determination step 320, when it is determined that the GDI fuel system 215 fails, the controller 200 may determine whether failure maintenance time of the GDI fuel system 215 is greater than a reference time (e.g., 3 seconds).

According to a lighting step 325, when the failure maintenance time is greater than the reference time, the controller 200 may control a warning light installed in the engine 205 to be turned on.

According to a change step 330, when the warning lamp is turned on (i.e., when the GDI fuel system 215 is determined to be faulty), the controller 200 may change the fuel system supplying fuel to the engine 205 to the MPI fuel System 210.

According to a calculation step 335, the controller 200 may calculate a difference value between torque of the engine 205 operated by the MPI fuel system 210 and torque of the engine operated by the GDI fuel system 215. For example, the torque of the engine 205 operated by the MPI fuel system 210 may be detected by a torque sensor installed in the engine and may be provided to the controller 200. The torque of the engine 205 operated by the GDI fuel system 215 may be provided to the controller 200 by a memory that stores a torque value of the engine by the GDI fuel system determined by a test. Describing the calculation step 335 in detail, the controller 200 may calculate the torque of the engine 205 reduced by the failure of the GDI fuel system 215.

Figure 5:
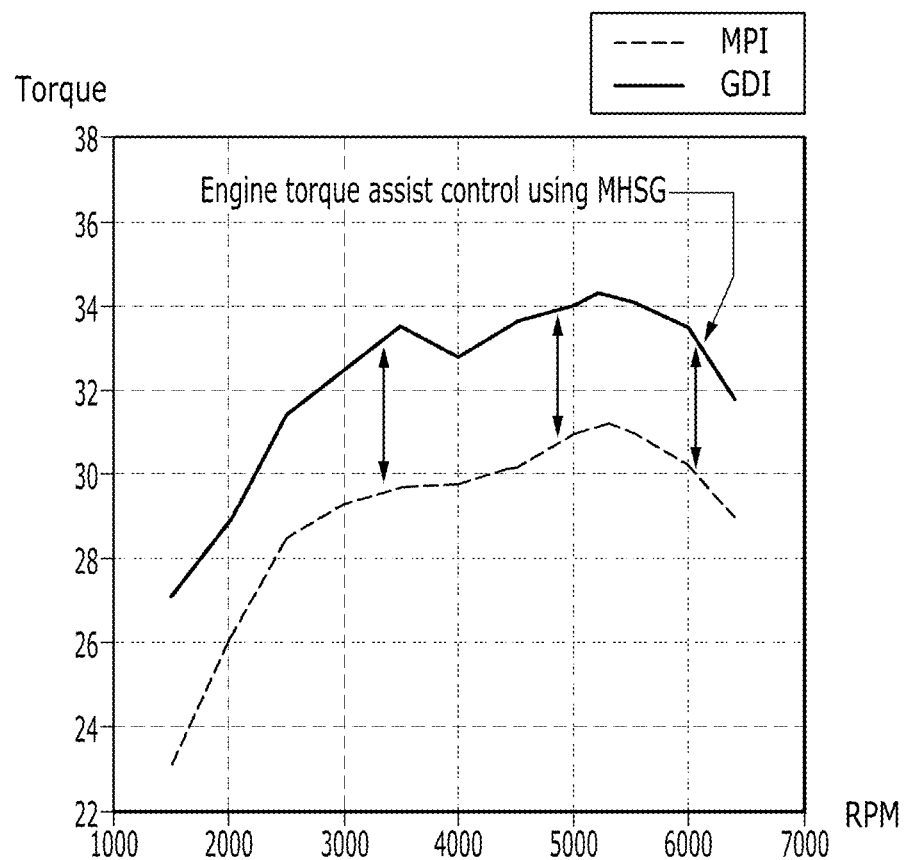
FIG. 5 is a graph for explaining the method for controlling the mild hybrid vehicle shown in FIG. 3.

According to a control step 340, as shown in FIG. 5, the controller 200 may control the starter-generator 30 to assist the torque of the engine 205 by the difference value. In a graph of FIG. 5, a horizontal axis may indicate a RPM and a vertical axis may indicate a torque. Referring to FIG. 5, torque of the engine 205 when the GDI fuel system 215 is operated may be greater than torque of the engine when the MPI fuel system 210 is operated.

As described above, when the failure of the part of the GDI fuel system occurs after the MPI fuel system is used (operated) at the start of the engine and the system for supplying fuel to the engine is changed to the GDI fuel system, according to embodiments of the present invention may switch the fuel system to the MPI fuel system and may make the vehicle drive normally by compensating for the torque reduction according to the switching.

The components, "~ unit", block, or module which are used in embodiments may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

As set forth above, embodiments have been disclosed in the accompanying drawings and the specification. Herein, specific terms have been used, but are just used for the purpose of describing embodiments of the present invention and are not used for qualifying the meaning or limiting the scope of the present invention, which is disclosed in the appended claims. Therefore, it will be understood by those skilled in the art that various modifications and equivalent embodiments are possible from the present invention. Accordingly, the actual technical protection scope of the present invention must be determined by the spirit of the appended claims.

DESCRIPTION OF SYMBOLS

30: MHSG
200: controller
205: engine
210: MPI fuel system
215: GDI fuel system

What is claimed is:

1. A method for controlling a vehicle, comprising:
controlling, by a controller, a multi-point injection fuel system such that the multi-point injection fuel system supplies fuel to an engine;
switching, by the controller, from the multi-point injection fuel system to a gasoline direct injection fuel system such that the gasoline direct injection fuel system supplies fuel to the engine when a number of rotation of the engine is greater than or equal to a reference speed after the multi-point injection fuel system is operated;
determining, by the controller, whether a failure of the gasoline direct injection fuel system occurs;
switching, by the controller, from the gasoline direct injection fuel system to the multi-point injection fuel system such that the multi-point injection fuel system supplies fuel to the engine when it is determined that the gasoline direct injection fuel system fails;
subsequently to switching to the multi-point injection fuel system, estimating, by the controller, a torque drop for a current rotational speed of the engine; and
controlling, by the controller, a starter-generator to assist torque of the engine by the estimated torque drop.

2. The method of claim 1, further comprising:
determining, by the controller, whether failure maintenance time of the gasoline direct injection fuel system is greater than a reference time when it is determined that the gasoline direct injection fuel system fails before switching from the gasoline direct injection fuel system to the multi-point injection fuel system.

3. The method of claim 2, further comprising:
controlling, by the controller, a warning light to be turned on when the failure maintenance time is greater than the reference time.

4. The method of claim 1, wherein the failure of the gasoline direct injection fuel system includes a failure of a gasoline direct injection injector included in the gasoline direct injection fuel system.

5. A device for controlling a vehicle, comprising:
a multi-point injection fuel system configured to supply fuel to an engine;
a gasoline direct injection fuel system configured to supply fuel to the engine when a number of rotation of the engine is greater than or equal to a reference speed after the multi-point injection fuel system is operated; and
a controller configured to determine whether a failure of the gasoline direct injection fuel system occurs,
wherein the controller is configured to:
switch from the gasoline direct injection fuel system to the multi-point injection fuel system such that the multi-point injection fuel system supplies fuel to the engine when it is determined that the gasoline direct injection fuel system fails, subsequently to switching to the multi-point injection fuel system, estimate a torque drop for a current rotational speed of the engine, and control a starter-generator to assist torque of the engine by the estimated torque drop.

\* \* \* \* \*